No. 618,327. Patented Jan. 24, 1899.
T. J. BRAY.
MANUFACTURE OF WELDED PIPE.
(Application filed May 14, 1898.)
(No Model.) 2 Sheets—Sheet 1.

Witnesses.
H. S. Rohrer.
Wm. O. Dyre.

Inventor:
Thomas J. Bray
by F. W. Ritter Jr.
atty.

No. 618,327. Patented Jan. 24, 1899.
T. J. BRAY.
MANUFACTURE OF WELDED PIPE.
(Application filed May 14, 1898.)

(No Model.) 2 Sheets—Sheet 2.

Witnesses:
Harry S. Rohrer
Wm E Dyre

Inventor:
Thomas J. Bray
by F. W. Ritter Jr.
atty.

United States Patent Office.

THOMAS J. BRAY, OF PITTSBURG, PENNSYLVANIA, ASSIGNOR OF ONE-HALF TO THE OIL WELL SUPPLY COMPANY, OF SAME PLACE.

MANUFACTURE OF WELDED PIPE.

SPECIFICATION forming part of Letters Patent No. 618,327, dated January 24, 1899.

Application filed May 14, 1898. Serial No. 680,660. (No model.)

*To all whom it may concern:*

Be it known that I, THOMAS J. BRAY, a citizen of the United States, residing at Pittsburg, in the county of Allegheny, State of Pennsylvania, have invented certain new and useful Improvements in the Manufacture of Welded Pipe; and I hereby declare the following to be a full, clear, and exact description of the same, reference being had to the accompanying drawings, in which—

Figure 1:
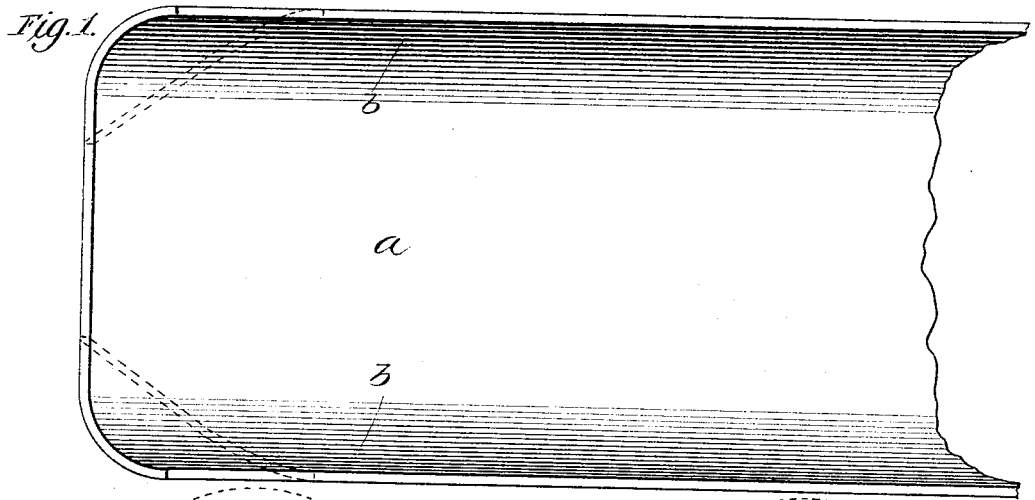
Figure 2:
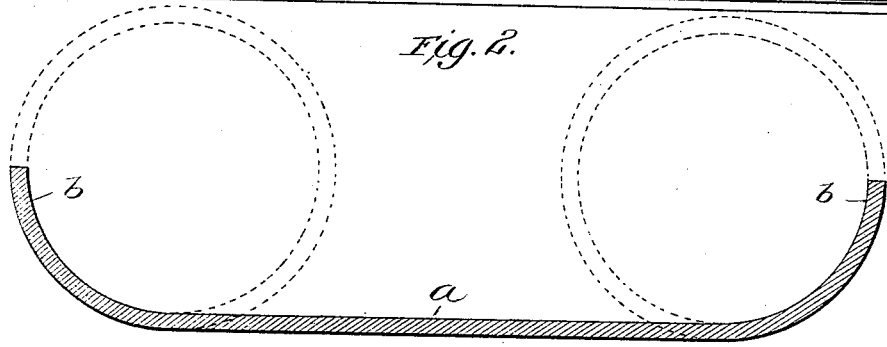
Figure 3:
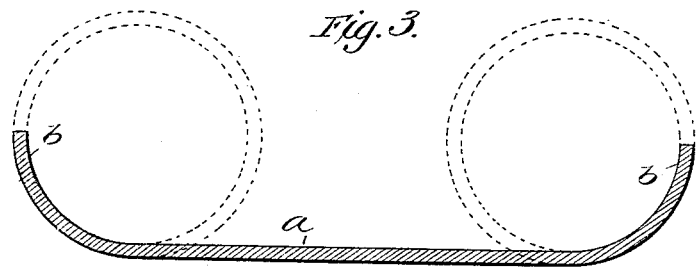
Figure 4:
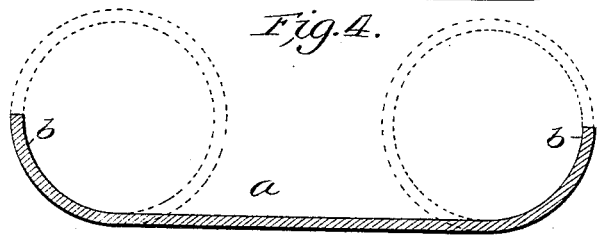
Figure 5:
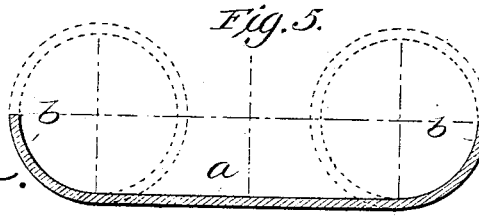
Figure 6:
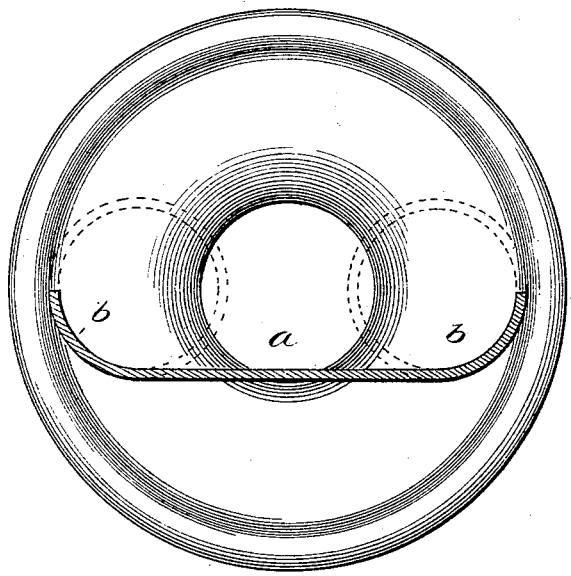
Figure 7:
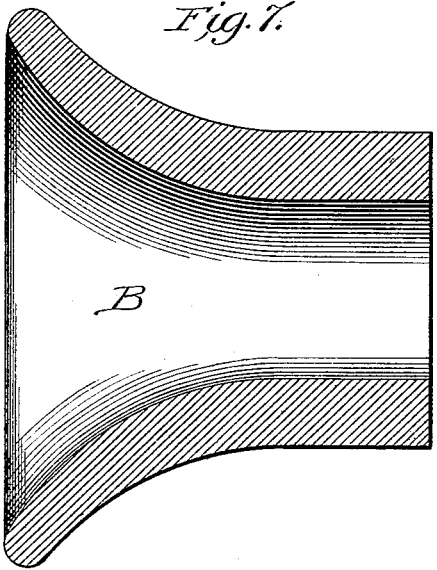

Figure 1 is a perspective view of a portion of a skelp for the manufacture of pipe embodying my invention. Figs. 2, 3, 4, and 5 are diagrams illustrating the preferred curvatures to be given the longitudinal edges of skelp for pipes of different diameter. Fig. 6 is a front view of a bell-die with diagram illustrating the position of a skelp embodying my invention with relation to the die at the commencement of the bending and welding process. Fig. 7 is a vertical central section of the bell-die shown in Fig. 6.

Like symbols refer to like parts wherever they occur.

My invention relates to the manufacture of welded pipe from skelp, and while the same may be found generally useful in the manufacture of all welded pipe, and therefore is not to be taken as limited to any particular kind thereof, it has been specially devised by me for use in the manufacture of what is known in the art as "butt-weld" pipe made in bell-dies and commonly termed "bell-pipe" and will therefore be hereinafter described in connection with such method of manufacture.

The present practice in the manufacture of welded pipe as commonly followed is to prepare a flat strip or "skelp" of metal of a width demanded by the proposed pipe and of the required length, often some eighteen or twenty feet, by clipping therefrom the corners at one end and bending or crimping the edges of the skelp adjacent thereto to facilitate the introduction of the end of the skelp into the welding-bell or its equivalent, and in some instances, as for the smaller pipe, welding a "tag" to the clipped end of the skelp. The flat skelp thus prepared is introduced into a suitable furnace, in which it remains until the edges have attained a welding heat, whereupon it is drawn therefrom through the "bell" or its equivalent and placed contiguous to the furnace, and the bending and welding is thus effected.

The objections to the use of a flat skelp in the manufacture of pipe are several—viz., first, the difficulty of bringing the edges of the skelp to a proper welding heat without excessively heating the body of the skelp, with attendant difficulty of handling and increasing the tendency of the skelp to buckle in the subsequent steps of the process; second, the tendency of the edges of the skelp to gather sand and cinder in the furnace, and, third, the tendency of the edges of the skelp to chill on encountering the walls of the bell-die or equivalent bending and welding apparatus. From said causes result defective welds, or what are known as "caved" and "split" pipe.

Another method heretofore practiced has been to first form a skelp of U cross-section or one approximating a more or less complete circle and subsequently to treat such a skelp as hereinbefore noted. This method, however, has not been found advantageous, because, first, special means must be provided for maintaining the skelp in proper position in the furnace; second, the extended surface of the skelp exposed to the action of the heat causes the body of the skelp to be raised above the desired or bending temperature, and, third, because of a tendency of the edges to lose alinement (not abut properly) in the welding-die.

My present invention therefore is intended to overcome said difficulties experienced in the manufacture of pipe by the present methods and to reduce, if not entirely eliminate, the losses from caved and split pipe.

Generally stated, my invention embraces a method of manufacture wherein a trough-shaped skelp is so heated that its edges shall attain a welding heat while the body of the skelp is reaching a bending heat, and in said condition the skelp is passed from the heating-furnace into and through the bending and welding die, whereby a perfect weld is obtained and caving or splitting avoided.

As one of the preliminary steps of my method I roll or otherwise form a trough-shaped pipe-skelp—that is to say, one wherein the body or greater portion of the skelp is substantially flat—so as to rest upon the furnace-bottom, whereby its heating is retarded and its proper position in the furnace is insured and whose longitudinal edges for substantially the length of the skelp are bent or curved, so as to obtain an increased exposure and more rapid heating thereof, and such a skelp or its equivalent embodies another feature of my invention.

In employing a skelp having a wide flat center bottom and curved sides, as noted, the benefit derived will be the obtaining from the furnace for the operation of the bell a skelp with its edges free from sand, cinder, or other foreign matter and at a welding heat while the body of the skelp is at a much lower or bending heat; but in order to insure the alinement of the abutting edges and avoid contact with and chilling of the welding edges by the "bell" I prefer to curve the longitudinal edges of the skelp on the radius of the bell employed or the pipe to be formed, and such a skelp or its equivalent embodies a further feature of my invention.

I will now proceed to describe my invention more fully, so that others skilled in the art to which it appertains may apply the same.

In carrying out my invention I take the usual flat skelp or its equivalent—a strip of a width substantially equal to the circumference of the pipe to be manufactured therefrom and of the desired length—and subject the same to rolls or other well-known means for transforming metal in such manner as to retain for the central portion of said skelp for substantially half its width, more or less, its flat shape, while the lateral edges are bent or curved to convert the whole into a trough shape, having a bottom $a$, which will rest and have an extended bearing on the bed of the heating-furnace and sides $b\ b$, which will rise above the bed of the furnace and be exposed to the direct action of the heat upon both sides, while the main portion of the skelp is exposed on one surface or side only.

By preference the curved sides $b\ b$ are bent on a radius of the bell-die or in arcs of the circle constituting the circumference of the pipe to be produced, which will facilitate the subsequent bending and closure of the tube, and also by preference each curved side $b\ b$ will embrace one-fourth of the width of the skelp, more or less, while the flat section $a$ will constitute one-half, more or less, of the width of the skelp. Either before or subsequent to the bending of the skelp the corners may be clipped at one end for application of the tongs or a tag in the usual manner.

In manufacturing welded pipe from skelp of the character hereinbefore described the skelp is introduced into a skelp-heating furnace resting upon the bottom thereof, with the curved sides of the skelp projecting vertically, so as to expose both surfaces and the lateral edges, whereby said edges are rapidly brought to a welding heat while the body of the skelp, one surface only of which is exposed, is being raised to a bending heat. When the edges of the skelp have reached the welding heat and while the body of the skelp is still at a lower or bending heat, the skelp is passed from the furnace through the bell-die B (see Fig. 6) or a series of bell-dies or their equivalents in the usual manner. In entering the bell-die or welding-bell, if the lateral edges of the skelp have been bent up on the arc of a circle, as herein set forth, the welding edges will not come in contact with or be chilled by the bell, (see Fig. 6,) and as the body of the skelp is only at a bending heat there will be no tendency of the skelp to buckle or the welding edges to sink or cave; but said edges will be kept in alinement during the gradual closure of the pipe, so as to finally abut squarely and weld perfectly and uniformly for the length of the skelp.

Having thus described my invention, what I claim, and desire to secure by Letters Patent, is—

1. The method herein described for forming welded pipe which consists in preparing skelp by bending the lateral edges to form arcs of the finished pipe, introducing the same into a suitable heating-furnace with the body portion of the same resting upon the furnace-bottom and the lateral edges projecting above said bottom, raising the edges of the skelp to a welding heat and the body of the skelp to a bending heat, and finally passing said skelp from the furnace into and through a suitable contiguous welding device, substantially as and for the purposes specified.

2. A pipe-skelp for the manufacture of welded pipe, said skelp of trough shape having an extended flat center substantially half the width of the skelp adapted to contact with the bed of a furnace and curved or bent lateral edges, adapted to project above the bed or bottom of a furnace, substantially as and for the purposes specified.

3. A pipe-skelp for the manufacture of welded pipe, said skelp having a flat center and lateral curved edges each corresponding to an arc of the pipe to be formed therefrom, substantially as and for the purposes specified.

4. A pipe-skelp for the manufacture of welded pipe, said skelp having a flat center comprising substantially one-half the width of the skelp, and curved lateral edges each comprising substantially one-fourth the width of the skelp, substantially as and for the purposes specified.

5. The method herein described for forming welded pipe which consists in preparing skelp by bending the lateral edges to obtain a trough-shaped skelp having an extended flat center of a width substantially half the width of the skelp, more or less, and raised curved edges, introducing the same into a suitable heating-furnace with the flat body portion of the skelp resting upon the furnace-bottom and the lateral curved edges projecting above said bottom, raising the edges of the skelp to a welding heat and the body of the skelp to a bending heat, and finally passing said skelp from the furnace into and through a suitable contiguous welding device, substantially as and for the purposes specified.

In testimony whereof I affix my signature, in presence of two witnesses, this 13th day of May, 1898.

THOMAS J. BRAY.

Witnesses:
BELLA STRAUSS,
JOHN EATON.